United States Patent
Kalbacher et al.

(10) Patent No.: US 9,989,314 B2
(45) Date of Patent: Jun. 5, 2018

(54) HEAT EXCHANGER ASSEMBLY

(71) Applicant: Modine Manufacturing Company, Racine, WI (US)

(72) Inventors: Klaus Kalbacher, Rangendingen (DE); Rebecca Weiss, Esslingen (DE)

(73) Assignee: Modine Manufacturing Company, Racine, WI (US)

( * ) Notice: Subject to any disclaimer, the term of this patent is extended or adjusted under 35 U.S.C. 154(b) by 0 days. days.

(21) Appl. No.: 15/031,894

(22) PCT Filed: Nov. 17, 2014

(86) PCT No.: PCT/US2014/065941
§ 371 (c)(1),
(2) Date: Apr. 25, 2016

(87) PCT Pub. No.: WO2015/077182
PCT Pub. Date: May 28, 2015

(65) Prior Publication Data
US 2016/0265852 A1    Sep. 15, 2016

(30) Foreign Application Priority Data
Nov. 20, 2013  (DE) ........................ 10 2013 019 478

(51) Int. Cl.
*F28D 9/00*    (2006.01)
*F28F 3/02*    (2006.01)
(Continued)

(52) U.S. Cl.
CPC .......... *F28D 9/005* (2013.01); *F02B 29/0437* (2013.01); *F02B 29/0462* (2013.01);
(Continued)

(58) Field of Classification Search
CPC .... F28D 1/0333; F28D 1/0341; F28D 1/0325; F28F 9/0246; F28F 9/0253; F28F 9/0251; F28F 9/001
(Continued)

(56) References Cited

U.S. PATENT DOCUMENTS 4,258,785 A     3/1981  Beldam
4,487,038 A  *  12/1984 Iijima ................... F25B 39/022
                                                   165/153

(Continued)

FOREIGN PATENT DOCUMENTS

CN      101240981          8/2008
DE      102006048667 A1    4/2008
(Continued)

OTHER PUBLICATIONS

First Office Action from the State Intellectual Property Office of China for Application No. 201480057505.X dated Apr. 14, 2017 (20 pages).

(Continued)

*Primary Examiner* — Len Tran
*Assistant Examiner* — Eric Ruppert
(74) *Attorney, Agent, or Firm* — Michael Best & Friedrich LLP; Jeroen Valensa; Michael J. Bergnach

(57) ABSTRACT

A heat exchanger assembly, by means of which compressed charge air for an internal combustion engine is cooled by way of a liquid, includes a housing with a heat exchanger that has a stack of pairs of plates and fins which are arranged between the pairs, and has two longitudinal sides and two transverse sides. Flow plates are arranged in the plate pairs and, toward the longitudinal sides, expose in each case one edge channel within the plate pairs. An inlet and an outlet are connected to the edge channels, and a liquid flows through the flow plates between the edge channels, the liquid flowing (Continued)

in counterflow with respect to the charge air which flows in on one side of the housing, through the fins, and leaves the housing again on an opposite other side.

15 Claims, 6 Drawing Sheets

(51) Int. Cl.
F28D 1/03 (2006.01)
F02B 29/04 (2006.01)
F28D 21/00 (2006.01)

(52) U.S. Cl.
CPC ............ *F28D 1/0341* (2013.01); *F28F 3/027* (2013.01); *F28D 2021/0082* (2013.01); *Y02T 10/146* (2013.01)

(58) Field of Classification Search
USPC ................................................. 165/166, 167
See application file for complete search history.

(56) References Cited

U.S. PATENT DOCUMENTS

| | | | |
|---|---|---|---|
| 5,042,577 A | 8/1991 | Suzumura | |
| 5,511,611 A | 4/1996 | Nishishita | |
| 5,632,328 A * | 5/1997 | Sawyer | B60H 1/00321 165/67 |
| 5,826,648 A | 10/1998 | Shimoya et al. | |
| 6,257,325 B1 | 4/2001 | Watanabe et al. | |
| 6,401,804 B1 * | 6/2002 | Shimoya | F28D 1/0333 165/133 |
| 6,543,528 B2 | 4/2003 | Saito et al. | |
| 2003/0000688 A1 | 1/2003 | Mathur et al. | |
| 2013/0105113 A1 | 5/2013 | Dolgonos | |

FOREIGN PATENT DOCUMENTS

| | | | |
|---|---|---|---|
| EP | 2412950 A1 | | 2/2012 |
| JP | 04244564 | * | 1/1991 |
| JP | 05306889 | * | 11/1993 |
| WO | WO2004008055 | * | 1/2004 |
| WO | 2013/001012 A1 | | 1/2013 |
| WO | 2013/149087 A1 | | 10/2013 |
| WO | 2013/162822 A1 | | 10/2013 |

OTHER PUBLICATIONS

International Search Report and Written Opinion for Application No. PCT/US2014/065941 dated May 28, 2015 (17 pages).

* cited by examiner

HEAT EXCHANGER ASSEMBLY

CROSS-REFERENCE TO RELATED APPLICATIONS

This application claims priority to German Patent Application No. DE 102013019478.4, filed Nov. 20, 2013, the entire contents of which are hereby incorporated by reference herein.

BACKGROUND

The invention relates to a heat exchanger assembly, by means of which compressed charge air for an internal combustion engine is cooled by way of a liquid, in which heat exchanger assembly the heat exchanger has a stack of pairs of plates and fins which are arranged between the pairs, and has two longitudinal sides and two transverse sides, furthermore with flow plates which are arranged in the plate pairs and, toward the longitudinal sides, expose in each case one edge channel within the plate pairs, and with an inlet and an outlet which are connected to the edge channels, the inlet and the outlet being situated together on one of the transverse sides, and, furthermore, the provision of a counterflow direction of the liquid which flows through the flow plates with respect to the charge air which flows through the fins, and, finally, with a housing, in which the stack or the heat exchanger is arranged, the charge air flowing in on one side of the housing, flowing through the fins and leaving the housing again on an opposite other side.

On account of the counterflow, said heat exchanger assembly has a satisfactory heat exchanging efficiency. The plates which form the heat exchanger shape have two parallel longitudinal sides and two parallel transverse sides which have approximately identical lengths or only slightly different lengths. There are applications, however, in which a known embodiment of this type is not sufficient with regard to the efficiency of the heat exchange.

SUMMARY

It is an object of the invention to tailor the described heat exchanger assembly to applications or to installation spaces which require a different heat exchanger shape. The heat exchanger assembly is to be configured simply and with structural features which are easy to manufacture, in such a way that it still promises high performance.

One aspect according to some embodiments of the invention of the heat exchanger assembly is that the plates have a slim shape, in which the ratio of the length to the width of the plates is configured to be greater than or equal to 2:1, preferably greater than 3:1, and in that a further inlet and a further outlet for the liquid are arranged. It is also provided that the inlets are connected to the inlet-side edge channel and the outlets are connected correspondingly to the outlet-side edge channel. It is advantageous, furthermore, that the inlets are situated close to that longitudinal side of the plates which is arranged remote from an air inflow side, and that the two outlets are arranged close to the other longitudinal side of the plates, which other longitudinal side represents the air inflow side.

It is also noteworthy that there is a converging liquid flow in the inflow-side edge channel and a diverging liquid flow in the outflow-side edge channel.

A heat exchanger assembly which is developed by way of at least some of said features has excellent heat exchanging efficiency even when the installation space for the heat exchanger assembly, for example in a motor vehicle, is very narrow, but can be extended in the longitudinal direction. The reason for this is that the available heat exchanging area, in particular the area which is occupied by the flow plates in the parent plates, is flowed through more intensively on account of the features according to the invention. The charge air outlet temperature is reduced and, above all, the temperature distribution is also homogenized.

Exemplary embodiments of the invention are to be described in the following text using the appended drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 5:
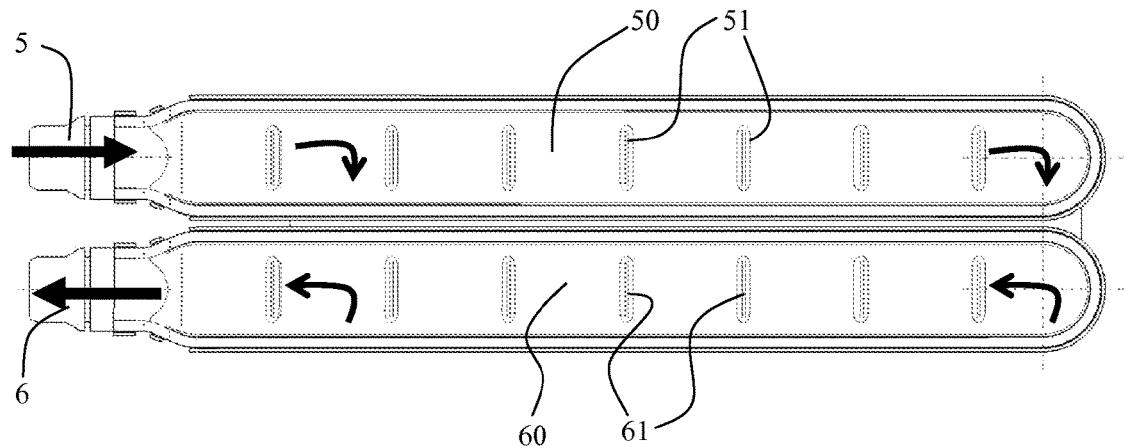
FIG. 5 shows a plan view of the embodiment according to FIG. 4.
Figure 6:
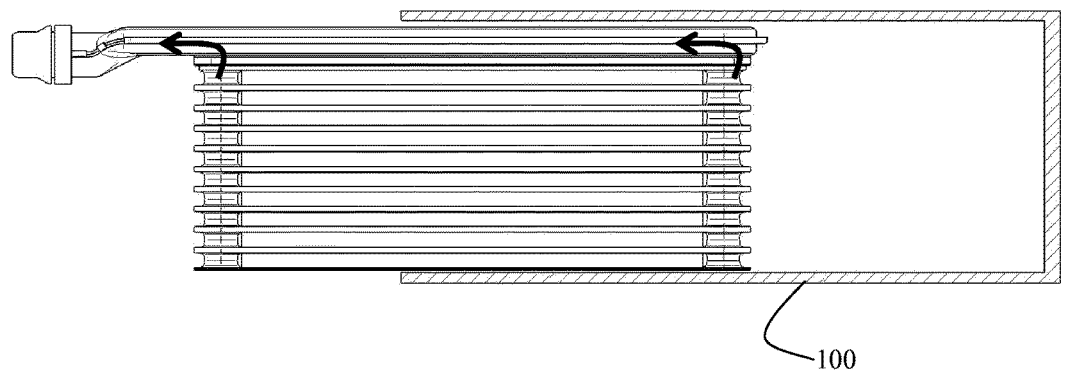
FIGS. 6 and 7 show an entire heat exchanger assembly.
Figure 7:
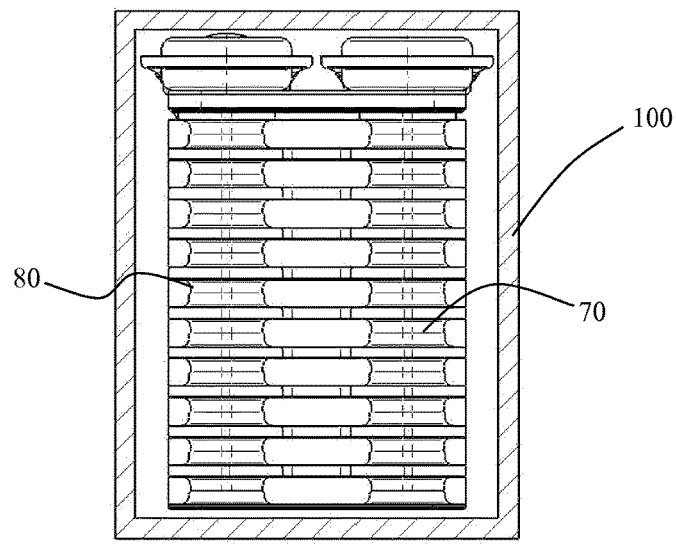

The heat exchanger assembly, by means of which compressed charge air for an internal combustion engine is cooled by way of a liquid, is depicted in its entirety in FIGS. 6 and 7; the illustration of details of the housing 100 has been dispensed with. The heat exchanger which is present in FIGS. 6 and 7 is that heat exchanger from FIGS. 4 and 5. It should be observed that FIG. 6 is a partially exploded view showing the heat exchanger being inserted into the housing 100.

Figure 4:
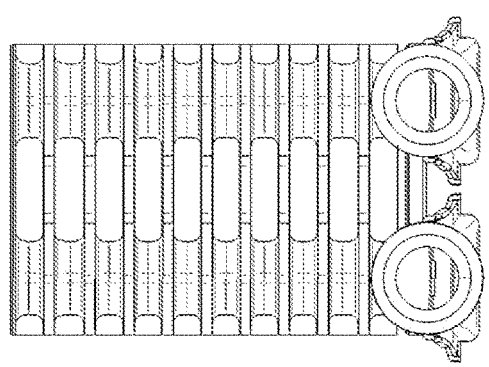
FIG. 4 shows a side view of a modified exemplary embodiment.

In FIGS. 4 and 5, an inlet stub 5 and an outlet stub 6 are situated on the side of the stack comprising plate pairs 1a, 1b and fins 2. This embodiment can facilitate the mounting of the stack in the housing 100 because said stack can be pushed simply through a lateral housing opening. For feeding and discharging of the liquid, in each case one feed channel 50 and one discharge channel 60 extend on the upper side of the stack and in the longitudinal direction thereof. The abovementioned channels 50, 60 have been formed in each case two shells in the exemplary embodiment. As can be seen from FIG. 5, reinforcing beads 51, 61 which are arranged at intervals have been provided in the shells. The channels 50, 60 have a flat oval cross section which emerges, however, in the laterally projecting region into an approximately round cross section because round inlet and outlet stubs 5, 6 are provided in the exemplary embodiment.

Figure 1:
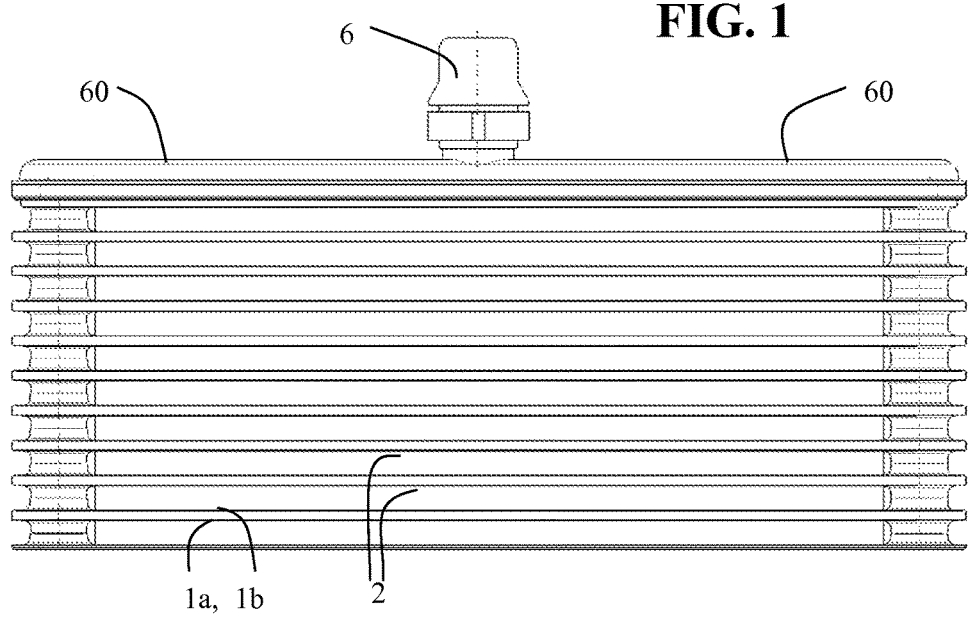
FIG. 1 shows a front view of the heat exchanger of the assembly.
Figure 2:
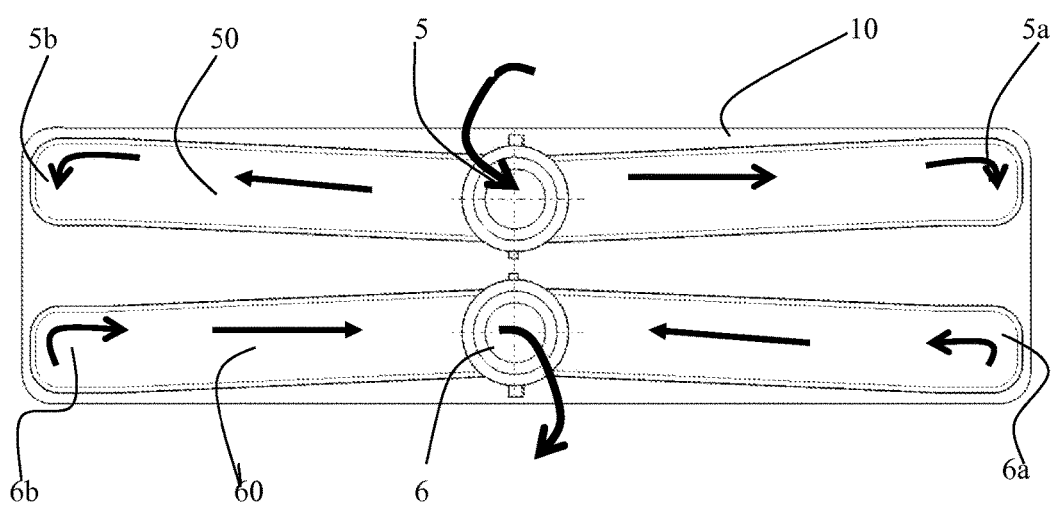
FIG. 2 shows a plan view of the embodiment according to FIG. 1.
Figure 3:
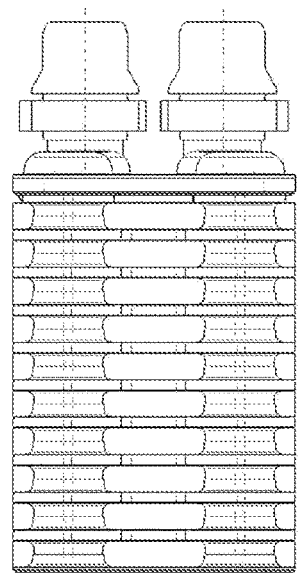
FIG. 3 shows a side view of the embodiment according to FIG. 1.

In contrast to FIGS. 4 and 5, it might be required if a heat exchanger according to FIGS. 1 to 3 is used for it to be necessary to mount the inlet and outlet stubs 5 and 6 which are seated on a cover plate 10 of the stack there through corresponding openings (not shown) in the housing 100. The inlet and outlet stubs 5, 6 are seated in a central position in FIGS. 1 and 2. The abovementioned feed and discharge channels 50, 60 are also present, but they have been formed here directly by way of deformation of the cover plate 10.

Suitable measures ensure that the liquid flow is divided approximately equally or up to approximately 70:30 to the two inlets 5a and 5b in the plates 1 which will be described in greater detail below.

Figure 8:
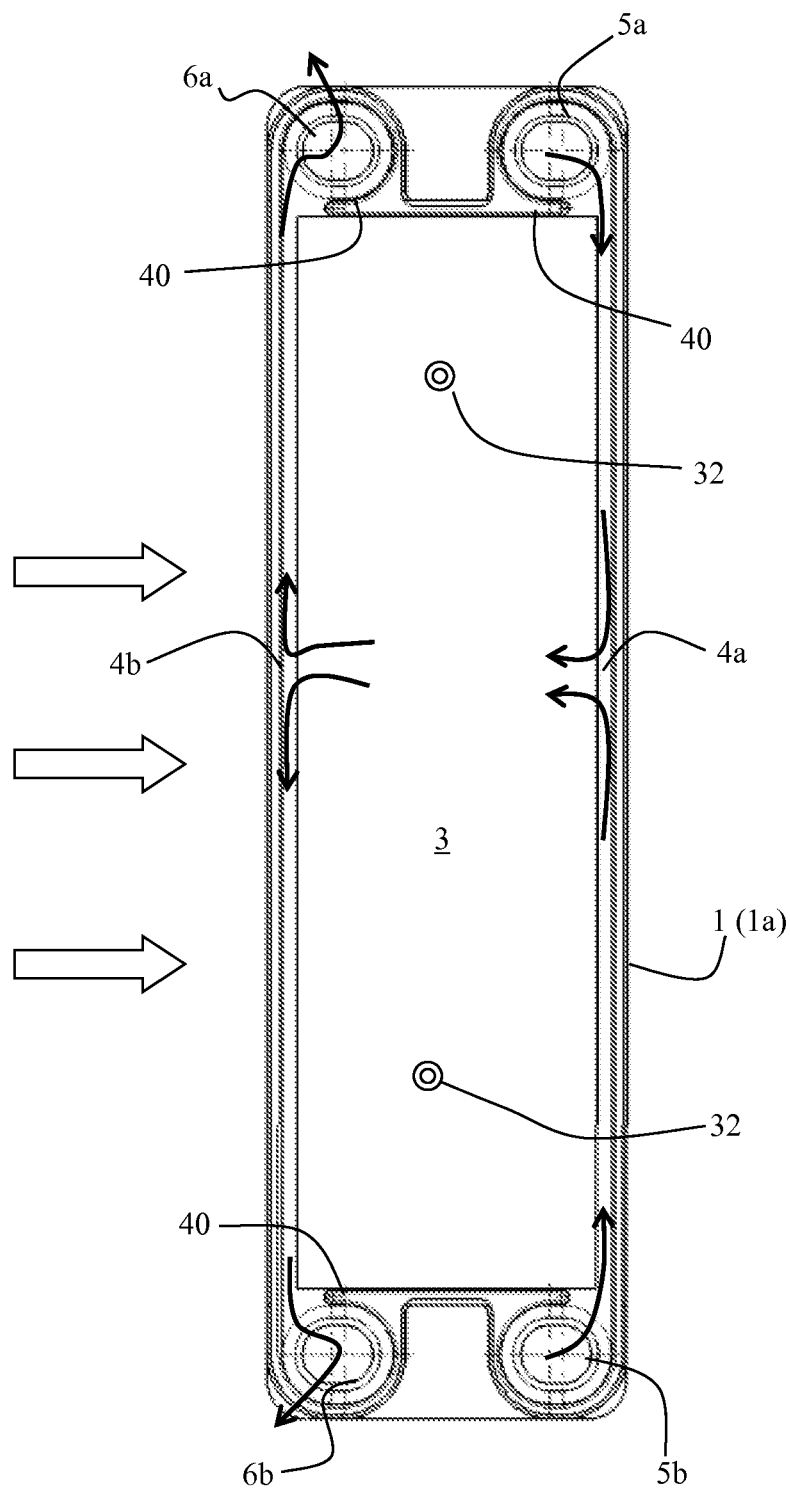
FIGS. 8 and 9 show details of the stack comprising plate pairs and fins.
Figure 9:
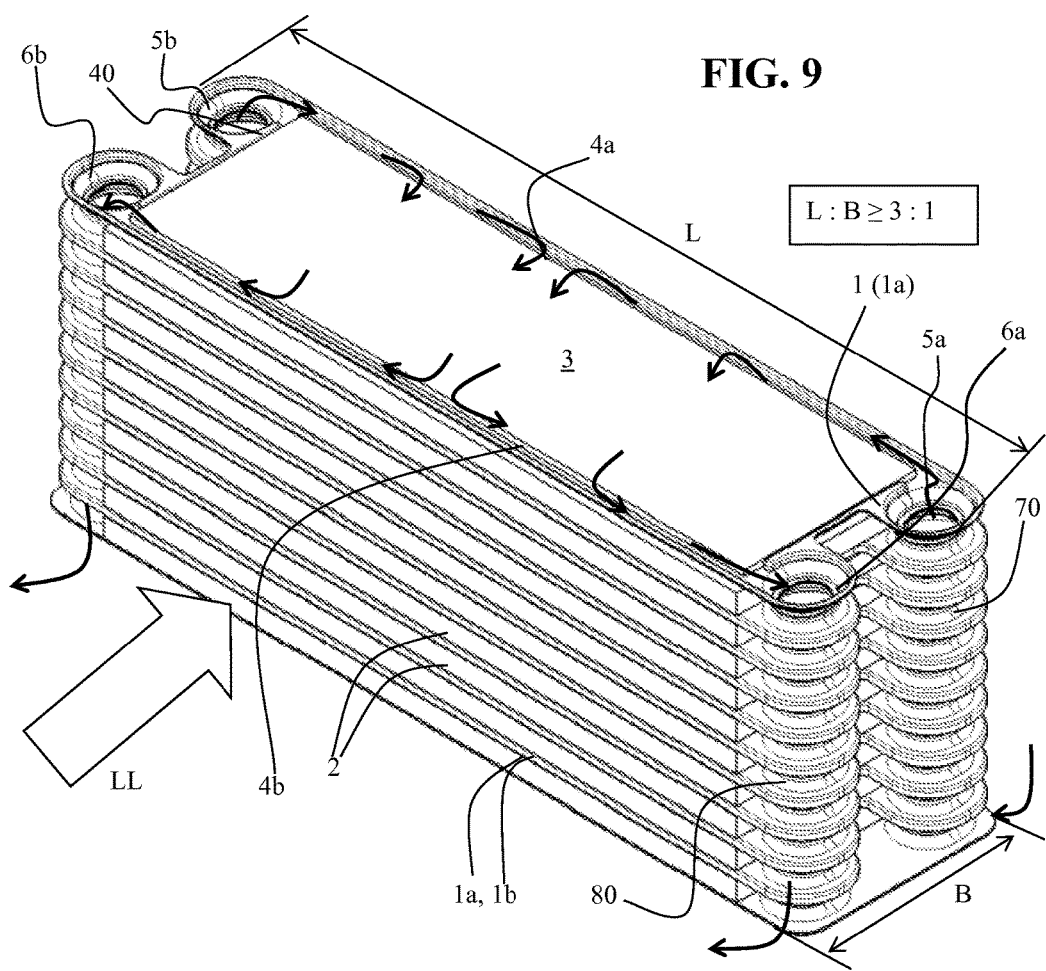
Figure 10:
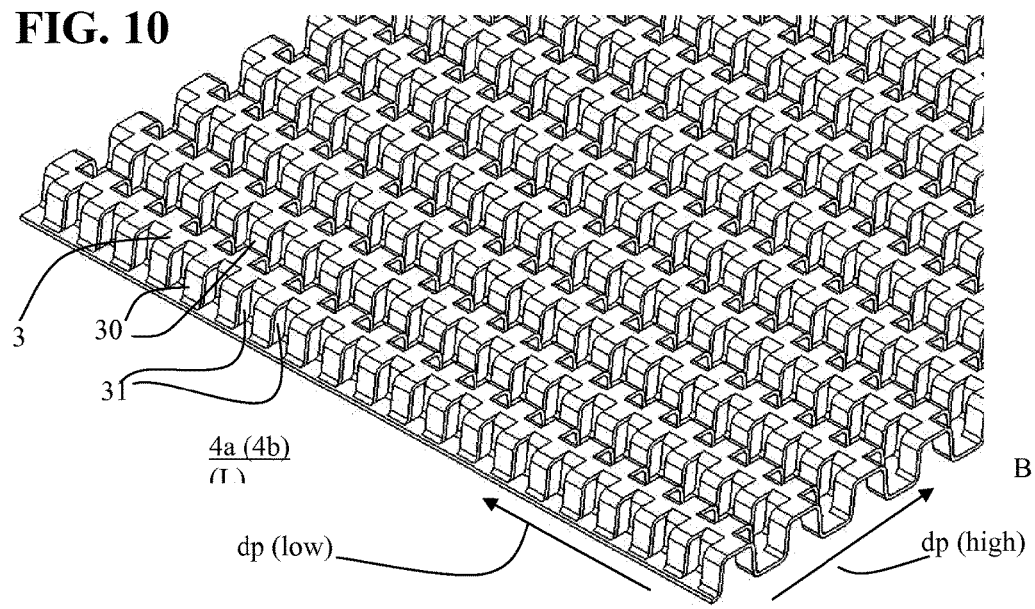
FIG. 10 shows one of the flow plates which are arranged in the plate pairs.

FIGS. 8 and 9, associated with FIG. 10, form the features which are essential for this proposal. The upper plate 1b has been removed from the upper plate pair 1a, 1b, with the result that the interior of the plate pairs is visible.

The heat exchanger has a stack of pairs 1a, 1b of approximately rectangular plates 1 and fins 2 which are arranged between the pairs. It has two longitudinal sides L and two transverse sides B. Flow plates 3 are situated in the plate pairs 1a, 1b. The flow plates 3 are somewhat narrower than the depth of the heat exchanger, or somewhat narrower than the extent of the transverse sides B, with the result that in each case one edge channel 4a and 4b, respectively, is formed between the longitudinal edges of the flow plates 3 and the longitudinal edges of the plates 1a, 1b. The edge channels 4a, 4b are accordingly situated within the plate pairs 1a, 1b and extend in their longitudinal direction.

The abovementioned inlet 5 and the outlet 6 are hydraulically connected in each case to one of the edge channels 4a and 4b, respectively. The edge channels 4a, 4b should be channels which are free, that is to say not constricted as far as possible, and therefore have a low flow resistance.

Figure 11:
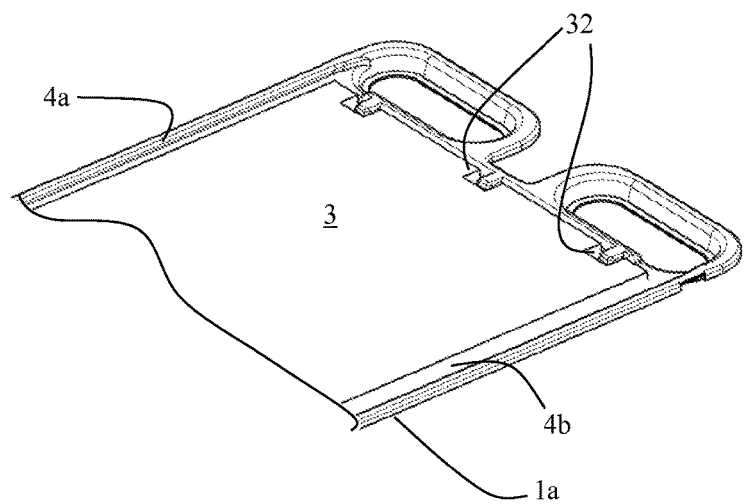
FIG. 11 shows part of another plate with an inserted flow plate.

With regard to the plate design, it is to be noted that each of the plates 1 has four openings which are of circular configuration in the exemplary embodiment but might also have a different design (FIG. 11, approximately oval openings). The openings represent two inlets 5a and 5b and two outlets 6a, 6b. It can also be said that the inlets 5a and 5b are arranged approximately at opposite ends of the inlet-side edge channel 4a. This applies correspondingly with regard to the arrangement of the two outlets 6a, 6b on the outlet-side edge channel 4b.

The openings or the inlet/outlets have shaped portions on their opening edges. In the exemplary embodiment, the height of the shaped portions corresponds in each case to half the height of the fins 2 which are positioned between the plate pairs. The shaped portions of one plate 1 of a plate pair 1a, 1b which make contact in the stack and are connected to one another can therefore form inlet and outlet channels which penetrate the stack perpendicularly with a plate 1 of the next plate pair 1a, 1b. An inlet channel has been provided, for example, in FIG. 8 with the designation 70 and one of the outlet channels has the designation 80. From the inlet channels 70 and the outlet channels 80, there are corresponding inlets into each plate pair 1a, 1b of the stack and outlets from each plate pair, which should be visible per se from FIG. 8 or 9.

One inlet 5a and one outlet 6a are situated together on one transverse side B of the plates 1, and the other inlet 5b and the other outlet 6b are arranged together on the opposite other transverse side B. Since they are situated in the corner regions of the plates 1, they are also arranged close to the respective longitudinal sides L of the plates. The plates 1 have a cutout in their transverse sides B between the inlet 5a and the outlet 6a and the inlet 5b and the outlet 6b. In other words, this means that the inlets and outlets 5a, 5b, 6a, 6b are formed in plate projections of the transverse sides B.

The throughflow of the plate pairs 1a, 1b and the flow plates 3 which are situated therein by means of liquid is indicated by way of illustrated arrows in FIGS. 8, 9 (and other figures). The liquid has approximately a counterflow direction with respect to the charge air which flows through the fins 2 and has been indicated by way of block arrows. In the present context, "approximately a counterflow direction" is to be understood to mean that there is at least one clear counterflow component. It is namely apparent from thermodynamic graphs (not shown) that the flow plates 3 are also flowed through obliquely in wide regions. The throughflow of the entire flow plates 3 has been improved considerably in comparison with the prior art.

The design of the flow plates 3 is shown by way of a view (shown in FIG. 10) of part thereof. The flow plates 3 have a corrugated configuration. Numerous cuts 31 are situated in the corrugation flanks 30 of the corrugations. On account of the cuts 31, the design which is shown permits the throughflow of the flow plates 3 in the corrugation running direction, which throughflow is associated with a high pressure last dp (high), and also a throughflow in a direction perpendicularly with respect to the corrugation running direction, which throughflow is associated with a considerably lower pressure loss dp (low). In FIG. 10, the positioning and the orientation of the flow plates 3 within each plate pair 1a, 1b has been emphasized by way of the specification of the designations 4a or 4b which, as has already been mentioned above, denote the edge channels. This makes it clear that the corrugation running direction runs transversely with respect to the direction of the two edge channels 4a, 4b, that is to say represents the transverse direction B which is at the same time the direction of the high pressure loss dp (high). Accordingly, the longitudinal direction L is the direction of the low pressure loss dp (low).

The plates 1a, 1b have a slim shape. In the exemplary embodiment, the ratio of their length L to their width B is approximately 3:1. As a result, the heat exchanger assembly is suitable for use in narrow installation spaces, for example of a motor vehicle.

The abovementioned arrows also emphasize that the inlets 5a, 5b are situated close to that longitudinal side L of the plates 1a, 1b which is arranged remote from an air inflow side. In contrast, the outlets 6a, 6b are arranged close to the other longitudinal side L of the plates 1a, 1b, which other longitudinal side L represents the air inflow side. It can be seen, furthermore, that there is a converging liquid flow in the inflow-side edge channel 4a and, in contrast, that there is a diverging liquid flow in the outflow-side edge region 4b.

Moreover, it can be seen that there is a throughflow in the edge channels 4a, 4b, which throughflow is oriented in a crossflow with respect to the charge air.

Plate shaped portions which provide paths 40 (FIGS. 8, 9) are also present in the inlet and outlet regions which are present in the vicinity of the two transverse sides B of the plates 1, which inlet and outlet regions should be of very narrow or small configuration in comparison with the remaining plate design, in particular the plate length L. With the aid of the paths 40, the liquid is diverted into one edge channel 4a and out of the other edge channel 4b into the outlet. As a result, the throughflow characteristic is assisted in terms of the promised performance improvement for elongate heat exchanger assemblies.

FIG. 11 shows one advantageous design in terms of manufacturing technology for the plates 1 and the flow plates 3. In order for it to be possible to position the flow plates 3 in the plate pairs simply and in the process also to provide the edge channels 4a, 4b, it is appropriate to provide the flow plates 3 with cutouts 32 which are spaced apart and into which projections which are formed in the plates 1 engage. Positioning aids of this type can be situated on the transverse sides B. They should at any rate be arranged in such a way that the edge channels 4a, 4b in the longitudinal sides are not blocked. Accordingly, the positioning aids can also be lugs (projections) in the surface of the plates 1, which lugs are seated in corresponding holes in the flow plates 3, which is indicated in outline form in FIG. 8 and is marked with the designation 32.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. A heat exchanger comprising:
    a plurality of plate pairs arranged to form a stack, each plate being approximately rectangular in shape and having first and second longitudinal sides, first and second transverse sides shorter than the longitudinal sides, a first opening located at a corner of the plate defined by the first longitudinal side and the first transverse side, a second opening located at a corner of the plate defined by the first longitudinal side and the second transverse side, a third opening located at a corner of the plate defined by the second longitudinal side and the first transverse side, and a fourth opening located at a corner of the plate defined by the second longitudinal side and the second transverse side;
    a plurality of fins arranged between the plate pairs;
    a first inlet channel defined by contacting shaped edges of the first openings, the plurality of plate pairs being hydraulically connected by the first inlet channel;
    a second inlet channel defined by contacting shaped edges of the second openings, the plurality of plate pairs being hydraulically connected by the second inlet channel;
    a first outlet channel defined by contacting shaped edges of the third openings, the plurality of plate pairs being hydraulically connected by the first outlet channel;
    a second outlet channel defined by contacting shaped edges of the fourth openings, the plurality of plate pairs being hydraulically connected by the second outlet channel;
    a feed channel extending longitudinally along an upper side of the stack of plate pairs, the feed channel being in fluid communication with the first and the second inlet channels;
    a discharge channel extending longitudinally along an upper side of the stack of plate pairs, the discharge channel being in fluid communication with the first and the second outlet channels;
    a plurality of flow plates, one of said flow plates being housed within each of the plate pairs;
    a first plurality of edge channels, one of said first plurality of edge channels being provided within each of the plate pairs between that one of the plurality of flow plates housed within the plate pair and the first longitudinal sides of the plates of the plate pair, the first plurality of edge channels hydraulically connecting the first and second inlet channels; and
    a second plurality of edge channels, one of said second plurality of edge channels being provided within each of the plate pairs between that one of the plurality of flow plates housed within the plate pair and the second longitudinal sides of the plates of the plate pair, the second plurality of edge channels hydraulically connecting the first and second outlet channels,
    wherein the plurality of flow plates provide fluid flow paths between the first and second pluralities of edge channels.

2. The heat exchanger of claim 1, wherein the distance between the first and second longitudinal sides defines a heat exchanger width, the distance between the first and second transverse sides defines a heat exchanger length, and the ratio of the heat exchanger length to the heat exchanger width is at least 2:1.

3. The heat exchanger of claim 2, wherein the ratio of the heat exchanger length to the heat exchanger width is at least 3:1.

4. The heat exchanger of claim 1, wherein the feed channel and the discharge channel both extend into a laterally projecting region beyond one of the first and second transverse sides.

5. A heat exchanger assembly, comprising:
    a housing including a transverse opening, a transverse wall opposite to the transverse opening, a top wall, and a bottom wall;
    a heat exchanger inserted into the housing through the transverse opening, the heat exchanger comprising:
    a stack of plate pairs forming a first longitudinal side, a second longitudinal side opposite the first longitudinal side, a first transverse side adjacent the transverse wall, a second transverse side opposite the first transverse side, an upper side and a lower side, each of the plate pairs being hydraulically connected for a first fluid by at least one inlet and at least one outlet, the plate pairs forming fluid flow paths from one of the longitudinal sides to the other longitudinal side through the plate pairs for a first fluid;
    a feed channel extending longitudinally along the upper side of the stack of plate pairs from a feed channel closed end proximate to the first transverse side to a feed channel open end disposed beyond the second transverse side opposite the first transverse side, the feed channel being hydraulically connected to the at least one inlet; and a discharge channel extending longitudinally along the upper side of the stack of plate pairs from a discharge channel closed end proximate to the first transverse side to a discharge channel open end disposed beyond the second transverse side opposite the first transverse side, the discharge channel being hydraulically connected to the at least one outlet, wherein the feed channel and the discharge channel each extend through the transverse opening.

6. The heat exchanger assembly of claim 5, wherein the feed channel and the discharge channel each extend obliquely toward the lower side and away from the stack after each extends past the second transverse side and thereinafter extend longitudinally into the feed channel open end and into the discharge channel open end, respectively.

7. The heat exchanger assembly of claim 5, wherein the feed channel and the discharge channel each have a flat oval cross section over a first portion and a round cross section over a second portion, and wherein both the feed channel and the discharge channel transition from the flat oval cross section to the round cross section in a laterally projecting region beyond the second transverse side.

8. The heat exchanger assembly of claim 5, further comprising a round inlet stub joined to the feed channel open end and a round outlet stub joined to the discharge channel open end, wherein both the inlet stub and the outlet stub are entirely between the top wall and the bottom wall.

9. The heat exchanger assembly of claim 5, wherein the feed channel and the discharge channel are disposed side by side and both are sandwiched between the top wall of the housing and the upper side of the stack of plate pairs.

10. The heat exchanger assembly of claim 7, wherein one or more reinforcing beads are arranged along the first portions of both the feed channel and the discharge channel.

11. The heat exchanger assembly of claim 7, wherein at least one of the feed channel and the discharge channel comprises a top shell and a bottom shell.

12. The heat exchanger assembly of claim 11, wherein the top shell includes a top shell flat oval section and a top shell round section and the bottom shell includes a bottom shell flat oval section and a bottom shell round section.

13. The heat exchanger assembly of claim 12, wherein both the top shell and the bottom shell transition from the respective flat oval sections to the respective round sections in the laterally projecting region.

14. The heat exchanger assembly of claim 5, wherein each of the plate pairs is hydraulically connected by multiple inlets and multiple outlets, the feed channel having a fluid connection to each of the multiple inlets, and the discharge channel having a fluid connection to each of the multiple outlets.

15. The heat exchanger assembly of claim 14, wherein the multiple inlets comprise a first inlet arranged adjacent to both the first transverse side and the first longitudinal side and a second inlet arranged adjacent to both the second transverse side and the first longitudinal side, and wherein the multiple outlets comprise a first outlet arranged adjacent to both the first transverse side and the second longitudinal side and a second outlet arranged adjacent to both the second transverse side and the second longitudinal side.

* * * * *